United States Patent [19]

Dimmick et al.

[11] Patent Number: 4,822,052

[45] Date of Patent: Apr. 18, 1989

[54] GOLF CLUB GRIP ATTACHMENT FOR IDENTIFICATION AND BALL POSITION MARKING

[76] Inventors: Gary S. Dimmick, 667 4th St., Oakmont, Pa. 15139; Scott G. Lockerman, 930 Nevin Ave., Sewickley, Pa. 15143

[21] Appl. No.: 129,718

[22] Filed: Dec. 7, 1987

[51] Int. Cl.$^4$ ............................................. A63B 53/14
[52] U.S. Cl. .............................. 273/162 D; 273/32 A; 40/317
[58] Field of Search ............ 273/162 D, 162 R, 32 A, 273/162 A, 162 F, 81 R, 81 A, 81 D; 40/317, 311, 315, 331, 334

[56] References Cited

U.S. PATENT DOCUMENTS

| | | | |
|---|---|---|---|
| 1,840,003 | 1/1932 | Warden | 40/317 |
| 1,974,682 | 9/1934 | Margoshes | 40/317 |
| 2,083,872 | 6/1937 | Siegel | 40/317 |
| 2,261,959 | 11/1941 | Buttikofer | 273/162 D |
| 2,700,547 | 1/1955 | Kraeling, Jr. | 273/162 D |
| 2,979,335 | 4/1961 | Pruitt | 273/162 D |
| 3,684,294 | 8/1972 | Champion | 273/183 D |
| 3,977,674 | 8/1976 | Zeller | 273/162 D X |
| 4,168,067 | 9/1979 | Wiczer | 273/127 R |
| 4,195,837 | 4/1980 | Poulin | 273/81 R |
| 4,380,337 | 4/1983 | DiMatteo | 273/162 D |

FOREIGN PATENT DOCUMENTS 1043683 8/1963 United Kingdom ........... 273/162 D

Primary Examiner—George J. Marlo
Attorney, Agent, or Firm—Buchanan Ingersoll

[57] ABSTRACT

A matched set of golf club identification markers for each golf club in the golfer's bag each include a disc-like body portion with a cylindrical anchor member formed on the bottom surface of the body member. An enlarged conical head formed on the bottom of the cylindrical anchor member is forced through the vent hole on the golf club grip to snugly fit the anchor member within the vent hole. A protective collar is formed on the top surface of the body member and identification indicia are engraved within the space on the top surface of the body member that is protected by the annular collar. For the putter, a removable ball position indicator is added to the identification marker. The ball position indicator has a recess formed on the bottom surface for engaging a snap fastener-like head on the upper surface of the body. For the putter identification marker, the annular protective collar is discontinuous so that the edge of the ball position indicator may be reached to remove the ball position indicator from the marker to place it on the putting green.

15 Claims, 1 Drawing Sheet 4,822,052

GOLF CLUB GRIP ATTACHMENT FOR IDENTIFICATION AND BALL POSITION MARKING

BACKGROUND OF THE INVENTION

1. Field of the Invention

This invention relates to a matching set of markers for identifying each golf club in a set of clubs with the telephone number and other information about the owner of the clubs, including with an identification marker for the putter a removable disc that may be utilized as a ball position indicator on the putting green.

2. Description of the Prior Art

Many efforts have been made to provide golf club identification markers which attach to, or are formed integrally with, the end of a golf club grip. In addition, efforts have been made to provide an attachment for a putter which has a removable portion that may be utilized as a golf ball position indicator on the putting green. Examples of devices to identify golf clubs which are affixed to the end of the club grip are disclosed in U.S. Pat. Nos. 3,684,294 and 4,195,837. Examples of attachments to putter grips which have removable ball position indicators are disclosed in U.S. Pat. Nos. 2,979,335 and 4,380,337 and British Pat. No. 1,043,683. U.S. Pat. Nos. 3,684,294 and 4,195,837 disclose golf apparatus that feature information displayed on the end of a golf club grip under a plastic protective cover. If the plastic protective cover is loosened from the grip, the information displayed will either be destroyed or lost. Other devices for holding spot markers on the ends of golf clubs are disclosed in U.S. Pat. Nos. 2,700,547 and 2,261,959.

There is need for apparatus for forming a matched set of golf club identification markers wherein the identification marker for the putter also serves to retain a ball position indicator. While it has been suggested to provide indicators, the prior art devices do not present a solution to the need for efficiently identifying each golf club in a set of clubs.

SUMMARY OF THE INVENTION

In accordance with the present invention, there is provided a set of matching golf club identification markers for every golf club in the golf bag of a golfer, including the putter that includes a unitary structure having a circular disc-like body. A cylindrical anchor member projects downwardly from the disc-like body. The anchor member has an enlarged conical head formed thereon with the apex of the conical head pointing away from the body bottom surface. The base of the conical head forms a shoulder extending perpendicularly outwardly from the cylindrical anchor member. The conical head has a short cylindrical surface immediately adjacent the shoulder. The anchor member has a diameter such that the anchor member fits snugly within the hole in the end of a golf club grip so that the enlarged conical head distorts the hole when the conical head is inserted through the hole and thereafter the shoulder formed by the conical head prevents removal of the anchor member from the grip. A flange is formed on the disc-like body member and depends downwardly about the periphery of the body bottom surface in spaced annular relation to the anchor member. The flange snugly contacts the end of the grip when the conical head of the anchor is inserted through the hole in the grip and retained in the grip. An upstanding protective collar is formed on the disc-like body top surface near the outer periphery of the body top surface. The protective collar is raised above the body for at least one-half the total circumference of the collar. Identification indicia are engraved on the top surface of the body within the area bounded by the protective collar whereby the identification indicia becomes a permanent part of the golf club grip when the marker is affixed to the grip.

Further in accordance with the present invention, there is provided a two piece golf putter identification marker and ball position indicator that includes a circular disc-like body with a top surface and a bottom surface. An anchor member is formed on the bottom of the body and adapted to permanently connect the marker and ball position indicator to the end of the putter grip. An upstanding annular protective collar is formed on the body top surface near the outer periphery of the body top surface and defines a protected portion of the body top surface within the confines of the protective collar. The protective collar is discontinuous in at least two diametrically opposed positions on the collar. The collar is raised above the body top surface for at least one-half the total circumference of the collar. Identification indicia are engraved directly on the body top surface protected portion whereby the identification indicia becomes a permanent part of the putter grip when the marker and ball position indicator is connected to the end of the putter grip. A removable disc-like ball position indicator for indicating the position of a golf ball removed from the putting green has a top surface and a bottom surface with a diameter smaller than the diameter of the protective collar whereby the ball position indicator fits within the protective collar in juxtaposition to said body top surface protected portion. An indentation is formed within the ball position indicator bottom surface to receive the head of a snap fastener-like member. The head of a snap fastener-like member is formed on the top surface of the circular disc-like body within the body top surface protected portion. The ball position indicator is removably secured to the body when the ball position indicator indentation is mated with the head on the body. The ball position indicator, the indentation, the head and the protective collar are all so dimensioned that when the ball position indicator is positioned on the body, the protective collar extends above the disc-like ball position indicator bottom surface and around the edge of the ball position indicator.

Accordingly, the principal object of the present invention is to provide a matched set of golf club identification markers which may be attached to the ends of the golf club grips of every club in the golfer's bag.

Another object of the present invention is to provide a matching golf club identification marker for the putter which also has a removable golf ball position indicator removably secured thereto.

These and other objects of the present invention will be more completely disclosed and described in the following specification, the accompanying drawings and the appended claims.

DESCRIPTION OF THE PREFERRED EMBODIMENTS

Figure 1:
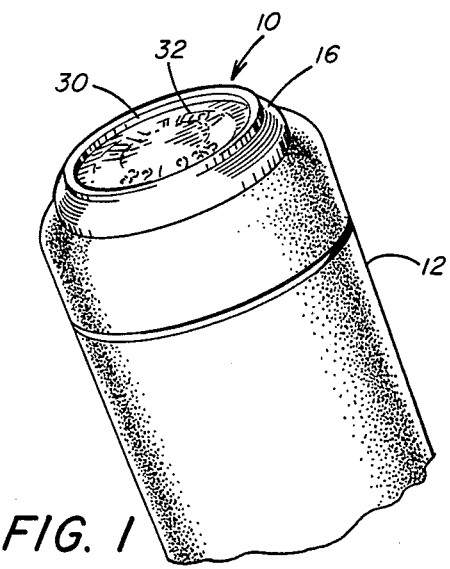
FIG. 1 is an isometric view of one golf club identification marker installed on the end of a golf club grip.
Figure 2:
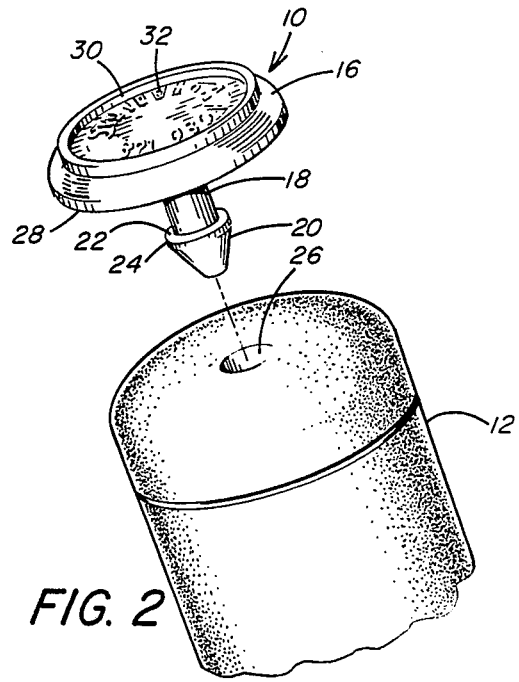
FIG. 2 is an isometric view of the golf club identification marker positioned above a golf club grip prior to installation.
Figure 3:
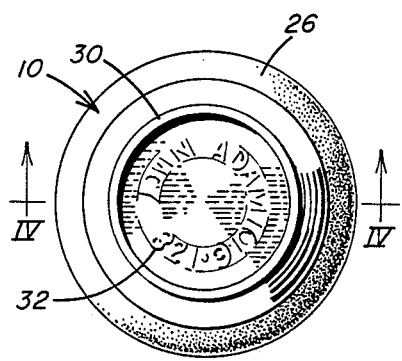
FIG. 3 is a top plan view of the marker and grip shown in FIG. 1.
Figure 4:
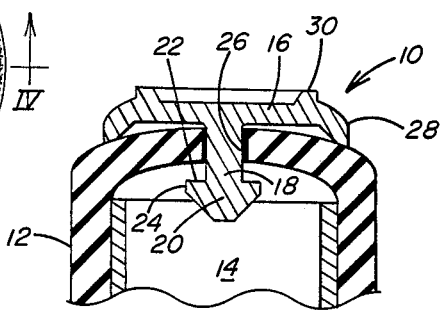
FIG. 4 is a sectional view taken along line IV—IV of FIG. 3, illustrating the marker installed on the end of a golf club grip.

Referring to the drawings, and particularly to FIGS. 1-4, there is illustrated a golf club identification marker generally designated by the numeral 10 removably affixed to a golf club grip 12. As shown in FIG. 4, the grip 12 is positioned over the golf club shaft 14 which is formed as a hollow metal or composite tube.

The marker 10 has a disc-like body 16 with a cylindrical anchor member 18 formed on the bottom surface thereof. The anchor member 18 has a conical head 20 formed on the end of the cylindrical anchor member 18. At the base of the conical head 20 an annular shoulder 22 extends radially from the anchor member 18. Adjacent to shoulder 22, the conical head 20 has a short cylindrical surface 24 which facilitates mounting of the identification marker 10 on the golf club grip 12 as will be described later in greater detail.

In conventional fashion, the golf club grip 12 has a vent hole 26 located in the top of the grip to permit the grip to be assembled onto the club and to facilitate drying of the adhesive which holds the grip 12 onto the shaft 14.

Referring to FIG. 4 the disc-like body 16 of identification marker 10 has an annular depending flange 28. The flange 28 abuts the top of the golf club grip 12 when the marker 10 is affixed to the grip 12. On the top surface of the disc-like body 16, an upstanding annular protective collar 30 is formed about the periphery of the body 16. As shown in FIG. 3, identification indicia 32 are engraved on the top of the marker 10 within the area protected by the protective collar 30. The identification indicia will include at least the telephone number of the owner of the club, as well as whatever other information is desired to be engraved upon the marker 10, such as the initials of the owner's name.

The marker 10 is preferably formed of a single piece of anodized aluminum since the light weight of the aluminum will not affect the swing characteristics of the golf club in any way. When the identification indicia 32 is engraved upon the anodized aluminum, the basic aluminum color shows through the colored anodized coating.

To affix the identification marker 10 to the golf club grip 12, the conical head 20 is forced through the vent hole 26 in grip 12. The cylindrical anchor member 18 has a diameter such that anchor member 18 fits in tight frictional engagement with the vent hole 26 so that the marker 10 remains in place. If desired, adhesive (not shown) may be placed between the flange 28 and the grip 12 to more securely retain the marker 10 in place. The shoulder 22 formed on the conical head 20 prevents the conical head from being withdrawn back through the vent hole 26.

In earlier models of the identification marker 10, it was found that when the short cylindrical surface 24 between the shoulder 22 and the conical surface of head 20 was not provided, the sharp edge formed at the inner section of shoulder 22 and the conical surface of head 20 caused the vent hole 26 to be torn and, in some cases, destroyed. It has been found that by providing the short cylindrical surface 24 adjacent to the shoulder 22, damage to the grip 12 and the vent hole 26 is prevented.

Figure 5:
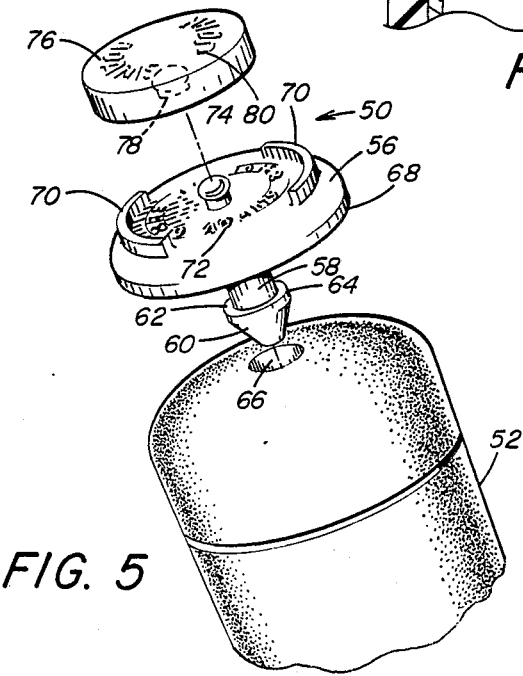
FIG. 5 is an exploded isometric view of the putter identification marker and ball position indicator prior to installation on the end of the golf club grip.
Figure 6:
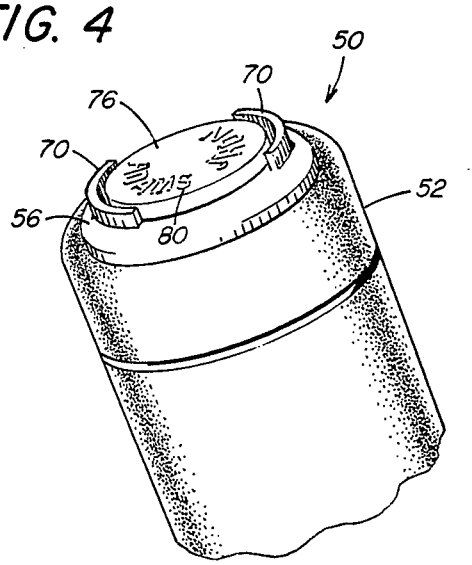
FIG. 6 is an isometric view of the identification marker and ball position installed on the end of the putter grip, illustrating the removable ball position indicator in place on the identification marker.

In the matched set of identification markers of the present invention, an identification marker and ball position indicator 50, as shown in FIGS. 5 and 6, has been provided for the putter. The marker and ball position indicator 50 is designed to be affixed to the putter grip 52. The marker and indicator 50 has a disc-like body 56. A cylindrical anchor member 58 is formed on the bottom of the body 56 and an enlarged conical head 60 is formed on the end of the anchor member 58. The shoulder 62 on the conical head 60 extends radially outwardly from anchor member 58. As earlier described in connection with marker 10, a short cylindrical surface 64 is provided adjacent to the shoulder 62. The vent hole 66 in the putter grip 52 receives the anchor member in close frictional engagement after the conical head 60 is forced through the vent hole 52. As in the marker 10 illustrated in FIGS. 1-4 a flange 68 (shown in FIG. 5) similar to flange 28 is formed about the lower periphery of body 56. The flange 68 contacts the putter grip 52 when the marker and ball position indicator 50 is installed on the putter grip.

An annular protective collar 70 is formed on the top surface of body 56 but is discontinuous at diametrically opposed portions of the protective collar. Identification indicia 72 consisting of at least the telephone number of the owner of the putter is engraved within the area protected by the protective collar 70.

A snap fastener-like head 74 is formed on the top surface of body 56 to accommodate the removable disc-like ball position indicator 76. Ball position indicator 76 has a recess 78 formed in the bottom surface thereof to mate with the snap fastener-like head 74 to thereby removably retain the ball position indicator 76 on the body 56. If desired, additional identification indicia 80, such as the initials of the golfer's name, may be placed on the top of the ball position indicator 76.

As seen in FIG. 6, when the ball position indicator 76 is in position on the body 56, the protective collar 70 extends above the ball position indicator 76 and protects it from being knocked off the body 56. The discontinuity in the protective collar 70 permits the golfer to reach the edge of indicator 76 to thereby remove it from the body 56 when it is to be placed upon the putting green.

According to the provisions of the patent statutes, we have explained the principle, preferred construction and mode of operation of our invention and have illustrated and described what we now consider to represent its best embodiment. However, it should be understood that, within the scope of the appended claims, the invention may be practiced otherwise than as specifically illustrated and described.

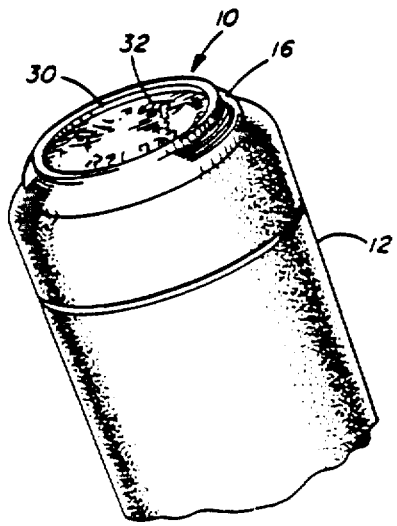

We claim:

1. A set of matching golf club identification markers for every golf club in the golf bag of a golfer, including the putter, each marker comprising, a unitary structure having a circular disc-like body with a top surface and a bottom surface, a cylindrical anchor member projecting downwardly from said disc-like body bottom surface, said anchor member having an enlarged conical head formed thereon with the apex of said conical head pointing away from said body bottom surface and a base of said conical head forming a shoulder extending perpendicularly outwardly from said anchor member, said conical head having a short cylindrical surface immediately adjacent said shoulder, said anchor member having a diameter such that said anchor member fits snugly within the hole in the end of a golf club grip so that said enlarged conical head distorts said hole when said conical head is inserted through said hole and thereafter said shoulder formed by said conical head prevents removal of said anchor member conical head from said grip, a flange formed on said disc-like body bottom surface and depending downwardly about the periphery of said body bottom surface in spaced annular relation to said anchor member whereby said flange snugly contacts the end of said grip when said conical head is inserted through said hole in said grip and retained in said grip, an upstanding protective collar formed on said disc-like body top surface near the outer periphery of said body top surface, said protective collar being raised above said body for at least one-half the total circumference of said collar, and identification indicia engraved on said body top surface within the area bounded by said protective collar whereby said identification indicia becomes a permanent part of said golf club grip when said marker is affixed to said grip.

2. A set of matching golf club identification markers as set forth in claim 1 wherein,
said protective collar is raised above the said body top surface for the entire circumference of said collar on every marker except the one for the putter.

3. A set of matching golf club identification markers as set forth in claim 1, wherein
the marker for the putter has said protective collar raised above said body top surface for more than one-half the entire circumference of said collar but substantially less than the entire circumference.

4. A set of matching golf club identification markers as set forth in claim 1, wherein
said identification indicia on each marker includes the telephone number of the golf club owner.

5. A set of matching golf club identification markers as set forth in claim 1, wherein
each marker is formed from anodized aluminum.

6. A one piece golf club identification marker comprising,
a circular disc-like body with a top surface and a bottom surface,
an anchor member formed on said body bottom surface and adapted to permanently connect said marker to the end of a golf club grip,
an upstanding annular protective collar formed on said body top surface near the outer periphery of said body top surface and defining a protected portion of said body top surface within the confines of said protective collar, and
identification indicia engraved directly on said body top surface protected portion whereby said identification indicia becomes a permanent part of said golf club grip when said marker is connected to the end of a golf club grip.

7. A one piece golf club identification marker as set forth in claim 6 wherein,
said anchor member is formed on said body bottom surface from a cylinder having the same diameter as the diameter of the hole in the end of a standard golf club grip projecting downwardly from said body bottom surface at the center of said body bottom surface,
an enlarged conical head formed on the end of said cylinder with the apex of said conical head pointed away from said body bottom surface and the base of said conical head forming an annular shoulder extending perpendicularly outwardly from said cylinder, and
said conical head having a short cylindrical surface immediately adjacent said shoulder.

8. A one piece golf club identification marker as set forth in claim 7 wherein,
said circular disc-like body has a flange formed on said body bottom surface about the periphery of said bottom surface in spaced annular relation to said anchor member cylinder whereby said flange snugly contacts the end of said golf club grip when said conical head is inserted through said hole in said grip and said anchor member is retained in said grip.

9. A one piece golf club identification marker as set forth in claim 6 wherein,
said identification indicia on said marker includes the telephone number of the golf club owner.

10. A one piece golf club identification marker as set forth in claim 6 wherein,
said marker is formed from anodized aluminum.

11. A two piece golf putter identification marker and ball position indicator comprising,
a circular disc-like body with a top surface and a bottom surface,
an anchor member formed on said body bottom surface and adapted to permanently connect said marker and ball position indicator to the end of the putter grip,
an upstanding annular protective collar formed on said body top surface near the outer periphery of said body top surface and defining a protected portion of said body top surface within the confines of said protective collar,
said protective collar being discontinuous in at least two diametrically opposed positions on said collar and said collar being raised above said body top surface for at least one-half the total circumference of said collar,
identification indicia engraved directly on said body top surface protected portion whereby said identification indicia becomes a permanent part of said putter grip when said marker and ball position indicator is connected to the end of said putter grip,
a removable disc-like ball position indicator for indicating the position of a golf ball removed from the putting green having a top surface and a bottom surface with a diameter smaller than the diameter of said protective collar whereby said ball position indicator fits within said protective collar in juxtaposition to said body top surface protected portion, an indentation formed within said ball position indicator bottom surface to receive the head of a snap fastener-like member, the head of a snap fastener-like member formed on the top surface of said circular disc-like body within said body top surface protected portion and adapted to removably secure said ball position indicator to said body when said ball position indicator indentation is mated with said head on said body, and said ball position indicator, said indentation, said head and said protective collar being so dimensioned that when said ball position indicator is positioned on said body, said protective collar extends above said disc-like ball position indicator bottom surface and around the edge of said ball position indicator.

12. A two piece golf putter identification marker and ball position indicator as set forth in claim 11 which includes, said anchor member being formed on said body bottom surface from a cylinder having the same diameter as the diameter of the hole in the end of a putter grip projecting downwardly from said body bottom surface at the center of said body bottom surface, an enlarged conical head formed on the end of said cylinder with the apex of said conical head pointed away from said body bottom surface and the base of said conical head forming an annular shoulder extending perpendicularly outwardly from said cylinder, and said conical head having a short cylindrical surface immediately adjacent said shoulder.

13. A two piece golf putter identification marker and ball position indicator as set forth in claim 12 which includes, said circular disc-like body having a flange formed on said body bottom surface about the periphery of said bottom surface in spaced annular relation to said anchor member cylinder whereby said flange snugly contacts the end of said putter grip when said conical head is inserted through said hole in said grip and said anchor member is retained in said grip.

14. A two piece golf club identification marker and ball position indicator as set forth in claim 11 wherein, said identification indicia on said marker includes the telephone number of the golf club owner.

15. A two piece golf club identification marker and ball position indicator as set forth in claim 11 wherein, both pieces of said marker and ball position indicator are formed from anodized aluminum.

* * * * *

UNITED STATES PATENT AND TRADEMARK OFFICE
CERTIFICATE OF CORRECTION

PATENT NO. : 4,822,052

DATED : April 18, 1989

INVENTOR(S) : Scott G. Lockerman et al.

It is certified that error appears in the above-identified patent and that said Letters Patent is hereby corrected as shown below:

The Title Page should be deleted to appear as shown on the attached sheet.

Signed and Sealed this

Twenty-ninth Day of August, 1989

Attest:

DONALD J. QUIGG

Attesting Officer

Commissioner of Patents and Trademarks

United States Patent [19]

Lockerman et al.

[11] Patent Number: 4,822,052
[45] Date of Patent: Apr. 18, 1989

[54] GOLF CLUB GRIP ATTACHMENT FOR IDENTIFICATION AND BALL POSITION MARKING

[76] Inventors: Scott G. Lockerman, 930 Nevin Ave., Sewickley, Pa. 15143; Gary S. Dimmick, 667 4th St., Oakmont, Pa. 15139

[21] Appl. No.: 129,718
[22] Filed: Dec. 7, 1987
[51] Int. Cl.⁴ .............................................. A63B 53/14
[52] U.S. Cl. ......................... 273/162 D; 273/32 A; 40/317
[58] Field of Search ............. 273/162 D, 162 R, 32 A, 273/162 A, 162 F, 81 R, 81 A, 81 D; 40/317, 311, 315, 331, 334

[56] References Cited

U.S. PATENT DOCUMENTS

| | | |
|---|---|---|
| 1,840,003 | 1/1932 | Warden ............................ 40/317 |
| 1,974,682 | 9/1934 | Margoshes ....................... 40/317 |
| 2,083,872 | 6/1937 | Siegel ............................... 40/317 |
| 2,261,959 | 11/1941 | Buttikofer ..................... 273/162 D |
| 2,700,547 | 1/1955 | Kraeling, Jr. ................. 273/162 D |
| 2,979,335 | 4/1961 | Pruitt ............................ 273/162 D |
| 3,684,294 | 8/1972 | Champion ..................... 273/183 D |
| 3,977,674 | 8/1976 | Zeller ........................ 273/162 D X |
| 4,168,067 | 9/1979 | Wiczer .......................... 273/127 R |
| 4,195,837 | 4/1980 | Poulin ............................. 273/81 R |
| 4,380,337 | 4/1983 | DiMatteo ..................... 273/162 D |

FOREIGN PATENT DOCUMENTS 1043683 8/1963 United Kingdom ........... 273/162 D

Primary Examiner—George J. Marlo
Attorney, Agent, or Firm—Buchanan Ingersoll

[57] ABSTRACT

A matched set of golf club identification markers for each golf club in the golfer's bag each include a disc-like body portion with a cylindrical anchor member formed on the bottom surface of the body member. An enlarged conical head formed on the bottom of the cylindrical anchor member is forced through the vent hole on the golf club grip to snugly fit the anchor member within the vent hole. A protective collar is formed on the top surface of the body member and identification indicia are engraved within the space on the top surface of the body member that is protected by the annular collar. For the putter, a removable ball position indicator is added to the identification marker. The ball position indicator has a recess formed on the bottom surface for engaging a snap fastener-like head on the upper surface of the body. For the putter identification marker, the annular protective collar is discontinuous so that the edge of the ball position indicator may be reached to remove the ball position indicator from the marker to place it on the putting green.

15 Claims, 1 Drawing Sheet